(12) United States Patent
Matsuda

(10) Patent No.: US 10,990,275 B2
(45) Date of Patent: Apr. 27, 2021

(54) ELECTRONIC DEVICE WITH SETTABLE LOW POWER CONSUMPTION MODE

(71) Applicant: KYOCERA Document Solutions Inc., Osaka (JP)

(72) Inventor: Masazo Matsuda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 25 days.

(21) Appl. No.: 16/421,873

(22) Filed: May 24, 2019

(65) Prior Publication Data
US 2019/0361600 A1 Nov. 28, 2019

(30) Foreign Application Priority Data

May 28, 2018 (JP) .............................. JP2018-101470

(51) Int. Cl.
| | | |
|---|---|---|
| *G06F 3/041* | (2006.01) | |
| *G06F 3/0488* | (2013.01) | |
| *G03G 15/00* | (2006.01) | |
| *G06F 1/3234* | (2019.01) | |

(52) U.S. Cl.
CPC ..... *G06F 3/04883* (2013.01); *G03G 15/5004* (2013.01); *G03G 15/5016* (2013.01); *G06F 1/3265* (2013.01); *G06F 3/0416* (2013.01)

(58) Field of Classification Search
CPC .. G06F 3/04883; G06F 3/0484; G06F 3/0488; G06F 3/0416; G06F 3/041
See application file for complete search history.

(56) References Cited

U.S. PATENT DOCUMENTS

| | | | | |
|---|---|---|---|---|
| 8,542,397 | B2* | 9/2013 | Yamaguchi | G03G 15/502 358/1.18 |
| 8,659,767 | B2* | 2/2014 | Iwase | G03G 15/234 358/1.13 |
| 8,687,211 | B2* | 4/2014 | Mitsui | G03G 15/5087 358/1.13 |
| 2011/0085205 | A1* | 4/2011 | Ouchi | G06F 3/128 358/1.15 |
| 2011/0279392 | A1* | 11/2011 | Yamaguchi | G03G 15/502 345/173 |
| 2014/0002844 | A1* | 1/2014 | Miyamoto | G06F 1/3231 358/1.13 |
| 2019/0332047 | A1* | 10/2019 | Okamoto | G03G 15/5004 |

FOREIGN PATENT DOCUMENTS

JP    2017-019137 A    1/2017

* cited by examiner

*Primary Examiner* — Vijay Shankar
(74) *Attorney, Agent, or Firm* — Studebaker & Brackett PC

(57) ABSTRACT

In an electronic device, a low power consumption mode is settable in which power supply to elements is restricted in a standby state. The device includes a touch panel display, a touch sensor, and a processor. The touch panel display includes a display for information display and a touch panel to receive user operation that are overlaid one on the other. The touch sensor detects a point of touch with a surface of the touch panel and a swipe operation of moving the point. In the mode, the touch panel display is in a display suspension state in which electric power supply to the display is restricted. When the user performs the swipe operation on the touch panel display in the display suspension state, the processor determines one of setting screens according to a movement direction of the swipe operation and causes the display to display the determined setting screen.

13 Claims, 6 Drawing Sheets

ELECTRONIC DEVICE WITH SETTABLE LOW POWER CONSUMPTION MODE

INCORPORATION BY REFERENCE

The present application claims priority under 35 U.S.C. § 119 to Japanese Patent Application No. 2018-101470, filed on May 28, 2018. The contents of this application are incorporated herein by reference in their entirety.

BACKGROUND

The present disclosure relates to an electronic device capable of being set, in a state in which no actual operation is performed, in a low power consumption mode in which electric power supply to respective elements of the electronic device is restricted in order to reduce electric power consumption.

In an electronic device such as a printer (an image forming apparatus) having a plurality of modes as operating modes that differ from each other in electric power consumption in operation, such as a low power consumption mode, a normal mode or the low power consumption mode is set through switching in a standby state of the electronic device. In the normal mode, electric power is supplied to almost all elements of the electronic device. In the low power consumption mode, electric power is supplied to only an element for receiving user operation and is not supplied to elements that consume much electric power. For example, in an image forming mechanism provided with a heater for fixing a toner pattern to a sheet at high temperature, electric power is supplied to the heater in the normal mode but is not supplied thereto in the low power consumption mode. In a situation in which electric power is not supplied to the heater for a long period of time, it takes a long time to start up the heater. Therefore, in the low power consumption mode, printing operation cannot be quickly started although electric power consumption can be reduced. By contrast, in the normal mode, much electric power is consumed although the printing operation can be quickly started upon input of a print job.

For the reasons as above, it is preferable that the normal mode is set in a situation in which it is assumed that the electronic device is used in a short period of time. Further, it is preferable that the low power consumption mode is set in a situation in which it is assumed that the electronic device is not used at least for a short period of time. Such switching between the operating modes is performed as appropriate with use status of the electronic device taken into consideration. For example, a technique is known by which such switching is performed using a motion sensor that detects presence or absence of a user.

Typically, a touch panel display having a display function to display necessary information and a function as an operation panel to receive user operation is used in many cases for operation of such an electronic device. In the above case, various operation keys are virtually displayed on the touch panel display. When a user touches a part of the touch panel display corresponding to one of the virtual operation keys, operation on the operation key is recognized. As such, the user can perform operation on the virtual operation keys in the same manner as on an operation key provided as hardware besides the touch panel display.

For example, in a case where a liquid-crystal display is used as the touch panel display, a backlight is used for displaying a screen of the liquid-crystal display. The electronic device is assumed not to be used for a while in the low electric power consumption, and therefore, the backlight is turned off and the display function is inactive. However, it is necessary to receive user operation even in the above situation, and therefore, the touch panel display is set to remain active for functioning as the operation panel.

Therefore, when the user touches the touch panel display for example in a backlight turning-off state, the operating mode is automatically switched from the low power consumption mode to the normal mode to turn on the backlight for display or the backlight is turned on and the display function is made active in a mode different from the normal mode. Thus, the user is enabled to subsequently perform setting for an operation of the electronic device through the touch panel display.

Before the user touches the touch panel display in the backlight turning-off state, the virtual operation keys are not displayed on the touch panel display due to the backlight being turned off. In such a situation, typically, the backlight is turned on and a preset initial screen is displayed upon the user touching any part of the touch panel display, unlike a case of an operation on an operation key. When the user subsequently operates the initial screen, an operation thereafter is performed.

For example, in a situation in which the electronic device is an image forming apparatus (a multifunction peripheral), the image forming apparatus has various functions such as a copy function of performing document copying, a scanning function of optically reading a document to create an image file, and a faxing function of performing faxing. The initial screen of the image forming apparatus is accordingly a menu screen for function selection.

SUMMARY

In an electronic device according to the present disclosure, a low power consumption mode is settable in which power supply to some of elements included the electronic device is restricted in a standby state. The electronic device includes a touch panel display, a touch sensor, and a processor. The touch panel display includes a display for information display and a touch panel to receive user operation that are overlaid one on the other. The touch sensor detects a point of touch and a swipe operation. The point of touch is a point of a surface of the touch panel where the user touches. The swipe operation is an operation of moving the point of touch. In the low power consumption mode, the touch panel display is in a display suspension state. The display suspension state being a state in which electric power supply to the display is restricted. When the user performs the swipe operation on the touch panel display in the display suspension state, the processor determines one setting screen of a plurality of setting screens according to a movement direction of the swipe operation and causes the display to display the one setting screen.

DETAILED DESCRIPTION

Figure 1:
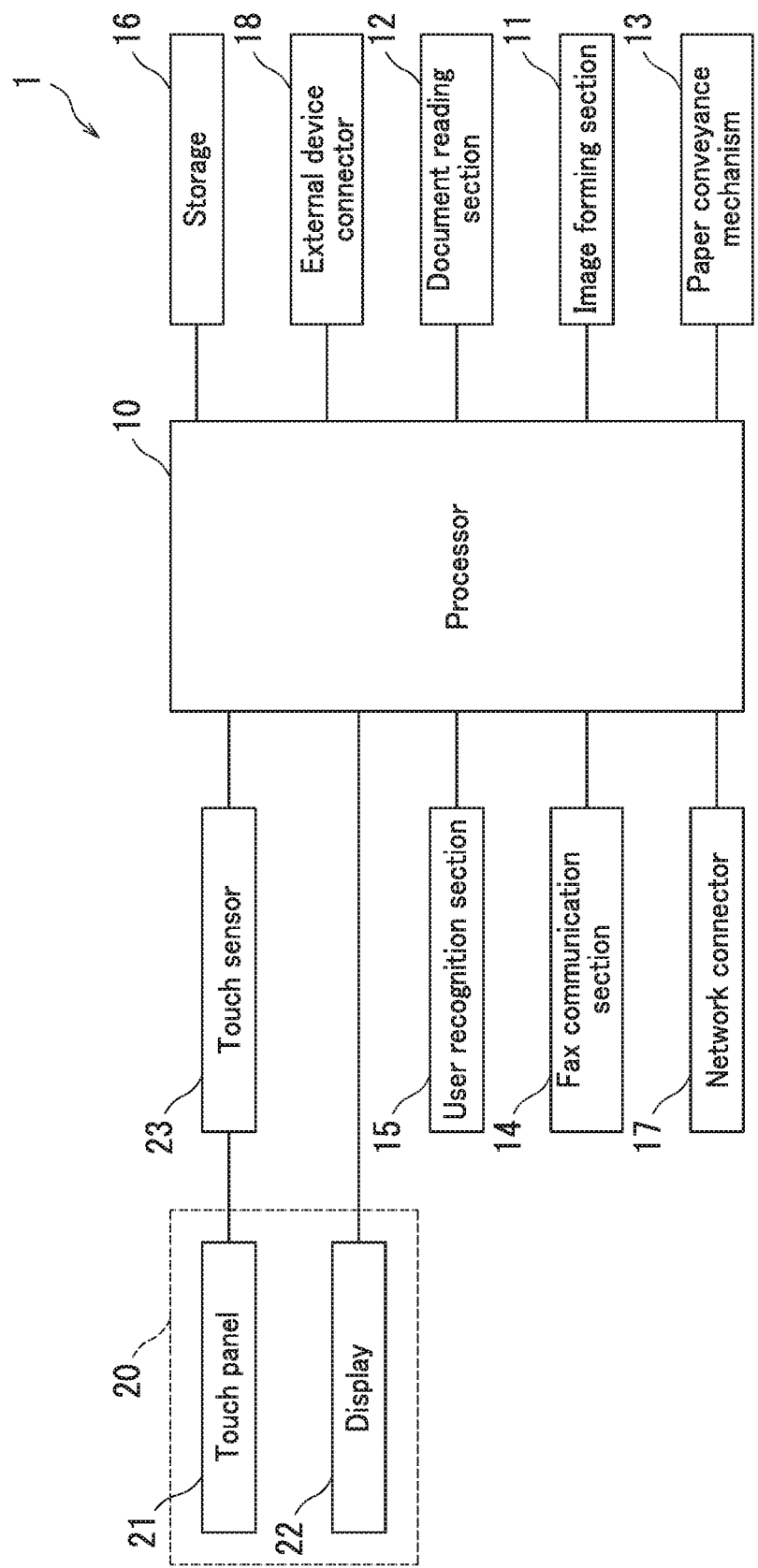
FIG. 1 is a diagram illustrating a configuration of a multifunction peripheral according to an embodiment of the present disclosure.

The following describes an electronic device according to an embodiment of the present disclosure. The electronic device is for example a multifunction peripheral that is an image forming apparatus having various functions. FIG. 1 is a block diagram illustrating a configuration of a multifunction peripheral 1.

The multifunction peripheral 1 includes an image forming section 11 that forms an image on a recording medium (paper) for output, a document reading section 12 that optically reads an image of a document to generate image data, and a paper conveyance mechanism 13 that conveys the paper in image formation by the image forming section 11. The multifunction peripheral 1 further includes a fax communication section 14 that is connected to a facsimile line (a telephone line) to transmit and receive facsimiles. Each of the above elements may be the same as respective known elements. An image output by the image forming section 11 is an image representing image data obtained by the document reading section 12 or an image obtained through the fax communication section 14. The multifunction peripheral 1 is capable of receiving a print job from a personal computer connected via a network and causing the image forming section 11 to execute the print job for print output. The multifunction peripheral 1 further includes a controller. The controller is a hardware circuit including a processor 10 such as a central processing unit (CPU). The processor 10 controls all elements of the multifunction peripheral 1 to cause the elements to perform respective desired operations.

The multifunction peripheral 1 further includes a touch sensor 23, a touch panel 21 that a user operates for causing the multifunction peripheral 1 to perform operations such as above, and a display 22 that displays a current status of the multifunction peripheral 1 and an operation instruction upon the user operating the touch panel 21. Actually, the touch panel 21 and the display 22 are provided as touch panel display 20 that is an inseparable unit. That is, the touch panel display 20 includes the display 22 for information display and the touch panel 21 to receive user operation that are overlaid one on the other. The touch panel display 20 is configured such that the touch panel 21, which is transparent, is secured on a surface of a liquid-crystal display provided with a backlight and serving as the display 22 to enable the touch sensor 23 to detect a part or an area where a user's finger or the like touches. The touch sensor 23 detects a point of the surface of the touch panel 21 where the user touches, and an operation to move the point of touch. The operation to move the point is for example a swipe operation. A resistive touch panel or an electrostatic touch panel can be used as the touch panel 21. The processor 10 is capable of recognizing an operation performed on the touch panel 21, such as a point of touch and subsequent movement of the point of touch, based on a result of detection by the touch sensor 23. Since the touch panel 21 is transparent, the user can perform an operation on the touch panel display 20 while viewing contents displayed on the display 22.

In the above configuration, when the display 22 is caused to display virtual operation keys and the user touches a point corresponding to one of the virtual operation keys on the touch panel 21, the processor 10 recognizes that the virtual operation key is operated and causes an operation or setting corresponding to the virtual operation key. That is, the user can use the virtual operation keys in the same manner as for operation keys constituted by ordinary mechanical switches as hardware. However, the virtual operation keys displayed on the display 22 can be optionally switched according to screen switching, which is the difference from the operation keys constituted as hardware.

The multifunction peripheral 1 further includes a user recognition section 15 and storage 16. Specifically, user authentication is necessarily performed for using some of the functions in using the multifunction peripheral 1. The user authentication is performed through the user inputting an authentication code by operating the touch panel display 20 (the touch panel 21). The user recognition section 15 determines whether or not the authentication code is passable, and the processor 10 then determines whether or not to subsequently execute the function. A code corresponding to for example a department (a code of a department) to which the user belongs can be adopted as the authentication code. In the above configuration, the processor 10 can manage the multifunction peripheral 1 on a department-by-department basis with a result that the number of sheets used can for example be grasped on a department-by-department basis for management. Data for the authentication is stored in the storage 16 that is constituted by non-volatile memory or a hard disk. The storage 16 also stores therein various additional data used for operations in the multifunction peripheral 1. The processor 10 reads out the data from the storage 16 as needed.

The multifunction peripheral 1 further includes a network connector 17 that is an interface to be connected to a network. The multifunction peripheral 1 receives a print job through the network connector 17 and causes the image forming section 11 to output a result of the print job. The multifunction peripheral 1 further includes an external device connector 18 to be connected to an external storage medium (for example, universal serial bus (USB) memory) for file transmission and receipt thereto and therefrom.

The image forming section 11 includes a mechanism for forming a toner pattern on a surface of a sheet of paper and a fixing mechanism for subsequent toner fixing to the sheet through application of heat and pressure to the sheet. The fixing mechanism includes an electric heater, which consumes much electric power. In a state in which electric power is not supplied to the heater, it takes time to normally operate the image forming section 11 through electric power supply.

Here, a normal mode or a low power consumption mode, each of which is an operation mode, is set for the multifunction peripheral 1 in a state in which the multifunction peripheral 1 is in a standby state (a state in which the image forming section 11, the document reading section 12, and the like are not actually operated). In the normal mode, electric power is normally supplied to all of the elements illustrated in FIG. 1. For example, in the standby state in the normal mode, electric power is supplied to the heater of the image forming section 11 to enable a quick operation start of the image forming section 11.

By contrast, electric power supply to some of the elements is restricted in the low power consumption mode. Specifically, it is assumed that the user does not use the multifunction peripheral 1 for at least a short period of time in the low power consumption mode. In view of the foregoing, electric power is not supplied to elements that consume much electric power, such as the heater of the image forming section 11. The backlight of the display 22 (the touch panel display 20) also consumes much electric power. In view of the foregoing, electric power is not supplied to the backlight. In the above configuration, various information and the virtual operation keys as above are not displayed on the touch panel display 20 in the low power consumption mode.

By contrast, electric power is supplied to the touch sensor 23 even in the low power consumption mode. The touch panel display 20 in the low power consumption mode is in a display suspension state in which the touch panel 21 is active while the display 22 is not active. That is, when the low power consumption mode is set, the touch panel display 20 is in the display suspension state in which electric power supply to the display 22 is restricted. It is necessary for the user to visually recognize the displayed virtual operation keys for performing a user operation on a virtual operation key. However, the user cannot perform such an operation in the display suspension state because the virtual operation keys are not displayed. By contrast, the touch panel 21 and the touch sensor 23 are active in the display suspension state, so that the processor 10 can recognize for example the user touching on the touch panel 21, a point of the touch panel 21 where the user touches, and movement (for example, a direction movement direction) of the point where the user touches.

Note that electric power is supplied to the document reading section 12, the paper conveyance mechanism 13, and the storage 16 in the low power consumption mode to the minimum amounts that enable to keep the respective elements in the standby state. Electric power is also supplied to the fax communication section 14 to the amount that enables fax transmission and receipt by the fax communication section 14.

When the user performs a swipe operation on the touch panel 21 in the low power consumption mode, the processor 10 of the multifunction peripheral 1 makes the display 22 active to display different setting screens according to a direction of movement of the swipe operation. The swipe operation is an operation in which the user touching the touch panel 21 moves a point of touch while keeping in touch therewith. The direction of movement of the swipe operation may be also referred to below as a movement direction of the swipe operation. The setting screens each correspond to one of the functions of the multifunction peripheral 1 that are performed by a combination of various elements illustrated in FIG. 1 upon an operation on the touch panel 21. The above configuration enables the multifunction peripheral 1 in the low power consumption mode to return to operation within a short period of time. Thereafter, the user performs a subsequent operation on a displayed setting screen. Thus, the multifunction peripheral 1 can be used efficiently. The following describes the subsequent operation.

The functions of the multifunction peripheral 1 herein include (1) a copy function. (2) a data transmission function, (3) an data internal storage function, and (4) a date external storage function. Note that the multifunction peripheral 1 also has a printing function by which a print job is received via the network connector 17 from a personal computer connected through the network, and executed for output by the image forming section 11. However, no operation on the touch panel 21 is necessary to carry out the printing function and the printing function is irrelevant to the present disclosure. Therefore, description of the printing function is omitted in the following description.

Here, the copy function is a function of optically reading an image of a document using the document reading section 12 and forming a new image corresponding to the image of the document on a recording medium (paper) for output using the image forming section 11. In carrying out the copying function, an identical image can be output on plural sheets of paper and various output formats are settable for such output.

The data transmission function, the data internal storage function, and the data external storage function are each a function of outputting as an image file (data) an image read in a manner as above, rather than printing and outputting. The data transmission function, the data internal storage function, and the data external storage function differ from one another in output form. The data transmission, the data internal storage function, and the data external storage function are each equivalent to an example of "image file outputting function". The data transmission function is a function of transmitting the image file to an external device through the network (the network connector 17). Email transmission and server message block (SMB) transmission can for example be performed by carrying out the data transmission function. The data internal storage function is a function of storing the image file in the storage 16. By carrying out the data internal storage function, the stored image file is saved for example on a user-by-user basis or a department-by-department basis using a folder or the like provided for each user or each department. The data external storage function is a function of storing the image file in a storage medium (for example, USB memory) connected to the external device connector 18.

The processor 10 pre-stores respective correlations between setting screens and movement directions of the swipe operation, and determines, based on the correlations, a setting screen to be displayed on the display 22 according to a movement direction of the swipe operation detected by the touch sensor 23. Specifically, when the swipe operation is performed on the touch panel 21 as described above, the processor 10 turns on the backlight of the display 22 and causes the display 22 (the touch panel display 20) to display a setting screen corresponding to one of the aforementioned four functions according to a recognized movement direction of the swipe operation. Here, the movement directions of the swipe operation, each of which corresponds to one of the four functions, include for example four directions of a rightward direction, a downward direction, a leftward direction, and an upward direction. The following describes an example in which the rightward direction corresponds to the copy function and the downward direction corresponds to the data transmission function for two functions among the four functions. Each correlation is pre-stored in the storage 16.

Figure 2A:
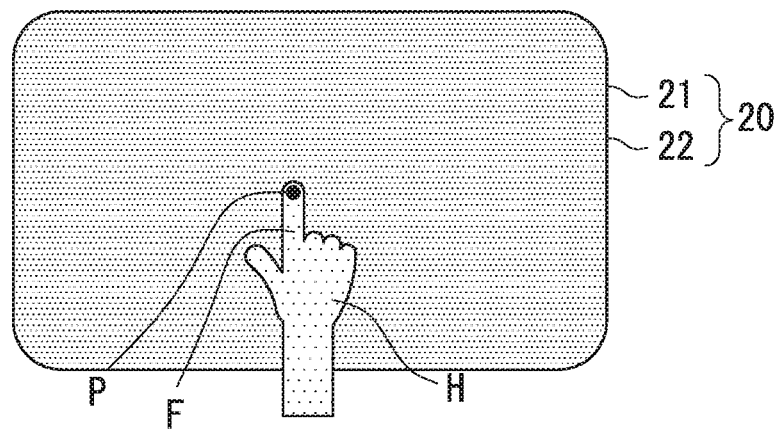
FIGS. 2A, 2B, and 2C are diagrams each illustrating a state of a touch panel display in a situation in which a swipe operation in a first direction is performed.
Figure 2B:
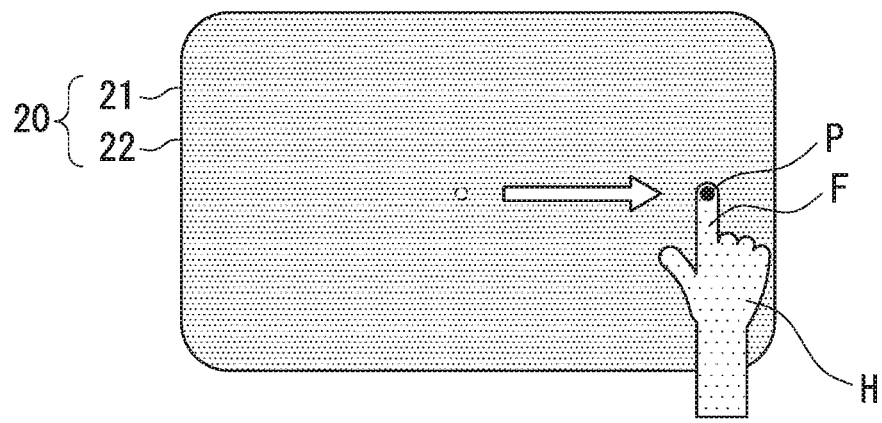

FIGS. 2A. 2B, and 2C illustrate an example of a state of the touch panel display 20 in a situation in which a rightward swipe operation (swipe operation in a first direction) is performed. The user first touches a specific part such as a central part of the touch panel display 20 (the touch panel 21) using a finger F (a hand H) as illustrated in FIG. 2A, and moves the finger F rightward while keeping the finger F in touch with the touch panel 21 as illustrated in FIG. 2B. The touch sensor 23 detects that the rightward swipe operation has been performed in this manner.

Here, the processor 10 can recognize a movement direction of the swipe operation as above through the touch sensor 23 detecting positional change of a contact point P of the finger F with the touch panel 21 by detecting a position of the contact point P in each state illustrated in FIGS. 2A and 2B. The backlight of the display 22 is off in this state, and the display 22 accordingly does not at all display the operation keys and the like. However, it is not necessary for the user to accurately confirm the position of the contact point P and it is only required that difference of the contact point P between the position illustrated in FIG. 2B and that in FIG. 2A be recognizable in order that the processor 10 recognizes the rightward swipe operation. Therefore, it is not necessary to display the operation keys and the like and the user can perform the operation easily even in the display suspension state.

Upon the user operating the touch panel display 20 in the display suspension state, the processor 10 determines an appropriate setting screen from the setting screens according to a movement direction of the swipe operation and causes the display 22 to display the determined setting screen. For example, when the processor 10 recognizes that the movement direction of the swipe operation is the rightward direction, the processor 10 recognizes that the copy function has been selected and causes the display 22 (the touch panel display 20) to display a setting screen illustrated in FIG. 2C. In the setting screen, a title display area T1 indicating that the currently displayed screen is a setting screen for the copy function is displayed in an upper part of the setting screen. A setting key group T2 including operation keys corresponding to items to be set for carrying out the copy function is displayed in a lower part of the setting screen. The items corresponding to the respective operation keys include: "Paper setting" for setting a size (a type) of paper to be used, "Zooming" for setting a magnitude of an image to be read by the document reading section 12; "Density" for adjusting a density of the image to be read by the document reading section 12: "Duplex/Simplex" for setting simplex printing or duplex printing for output; "Page gathering" for N-in-1 setting for output of plural document pages; and "Color" for adjusting a color of the image to be read by the document reading section 12. When one of the displayed operation keys is operated, the processor 10 causes display of a detailed setting screen corresponding to the operated operation key after display of the setting screen illustrated in FIG. 2C. When "Paper setting" is for example selected as a detail setting screen, a screen for selecting paper size and orientation that displays paper selection candidates such as "A3: portrait", "A3: landscape", "A4: portrait", and "A4: landscape" or a screen for selecting a paper cassette among attached paper cassettes is displayed. When another item (operation key) included in the setting key group T2 is selected, another detailed setting screen is displayed as appropriate according to the selected item.

Figure 3A:
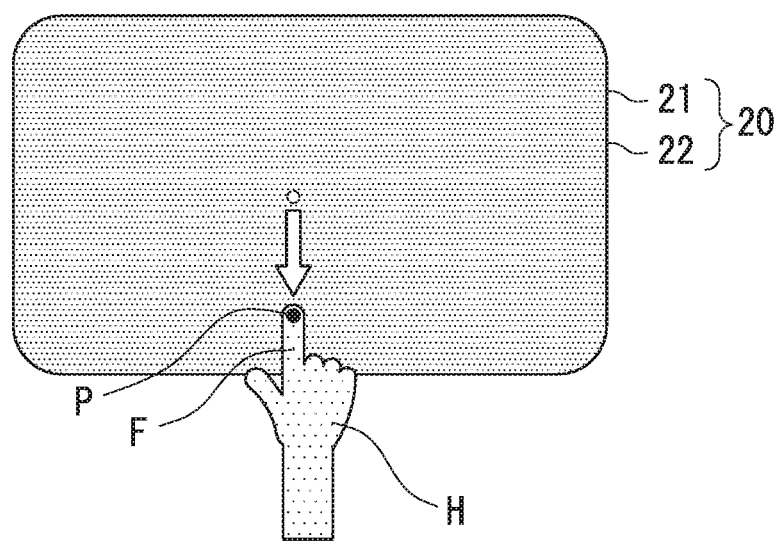
FIGS. 3A and 3B are diagrams each illustrating a state of the touch panel display in a situation in which a swipe operation in a second direction is performed.
Figure 3B:
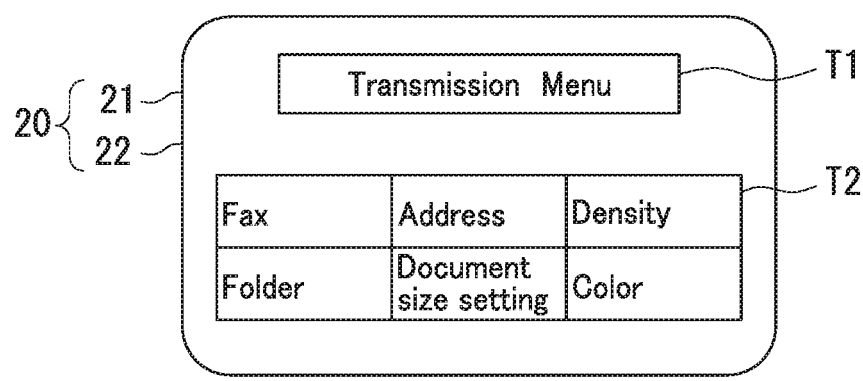

FIGS. 3A and 3B are diagrams illustrating a situation in which the movement direction of the swipe operation is the downward direction (the second direction), and respectively correspond to FIGS. 2A and 2B. Note that a situation directly after the user has touched the touch panel display 20 is the same as that illustrated in FIG. 2A. As illustrated in FIG. 3A, when recognizing that the downward swipe operation has been performed based on a result of detection by the touch sensor 23, the processor 10 recognizes that the transmission function has been selected and causes the display 22 (the touch panel display 20) to display a setting screen illustrated in FIG. 3B. Here, the title display area T1 indicating that the currently displayed screen is a setting screen for the transmission function is displayed in an upper part of the setting screen. The setting key group T2 including operation keys corresponding to items to be set for executing the transmission function is displayed in a lower part of the setting screen. The items corresponding to the respective operation keys include: "Fax" for setting a fax number of a transmission destination in a situation in which the transmission destination is a facsimile machine; "Address" for setting an email address of a transmission destination in email transmission; "Density" for adjusting a density of an image to be read by the document reading section 12: "Folder" for folder specification in a server of a transmission destination in SMB transmission: "Document size setting" for paper setting in fax transmission; and "Color" for adjusting a color of the image to be read by the document reading section 12. Once one of the items (operation keys) in the setting key group T2 is selected, a detailed setting screen according to the selected item is displayed as appropriate likewise in the case where the "Paper setting" for the copy function is selected.

The above example includes a case of the rightward swipe operation (first direction: corresponding to the copy function) and a case of the downward swipe operation (second direction: corresponding to the transmission function). However, even in cases of a leftward swipe operation and an upward swipe operation, other functions (data internal storage function and data external storage function) are set as appropriate. This can display detailed setting screens set for the respective functions upon swipe operations being performed in the corresponding directions.

FIGS. 2B and 3A illustrate the rightward swipe operation and the downward swipe operation, respectively. However, it is not necessary to perform a swipe operation in an exact rightward or downward direction. For example, when the movement direction of a performed swipe operation (a horizontal direction when a rightward swipe operation is performed) is in a range of ±20° of the rightward or downward direction, the processor 10 can recognize that a rightward or downward swipe operation has been performed. The touch sensor 23 can detect a position of the contact point P as illustrated in FIG. 2A, 2B, or 3A, and therefore, determination by the processor 10 as above is easy to perform.

Figure 2C:
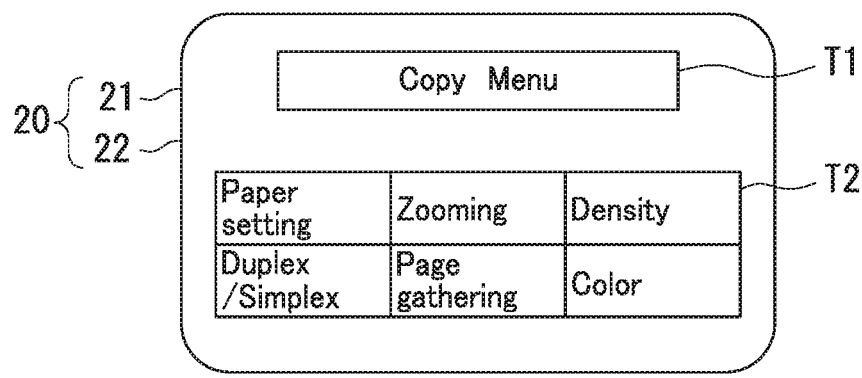
Figure 4A:
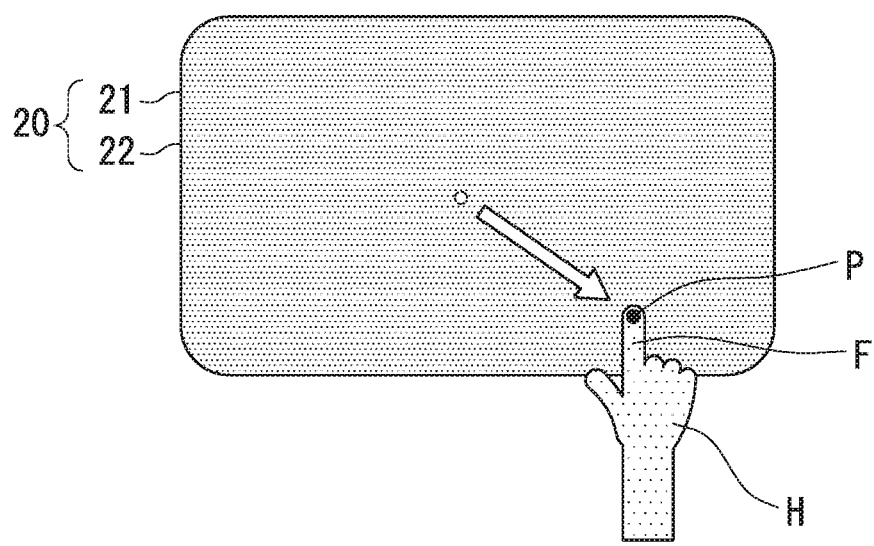
FIGS. 4A and 4B are diagrams each illustrating a state of the touch panel display in a situation in which a swipe operation in an intermediate direction between the first direction and the second direction is performed.

However, a setting screen to be displayed on the display 22 cannot be determined from the movement direction of a swipe operation detected by the touch sensor 23 based on the correlations in some cases even though the user operates the touch panel display 20 in the display suspension state. In such a situation, the processor 10 causes the display 22 to display an initial screen that differs from any of the setting screens. For example, as illustrated in FIG. 4A, when the movement direction of a swipe operation is a rightward and downward direction that is intermediate between the rightward direction (first direction) and the downward direction (second direction), the processor 10 cannot recognize that the movement direction of the swipe operation falls in any of the four directions. In such a situation, the processor 10 turns on the backlight and causes display of the initial screen for selecting a function from among the functions as illustrated in FIG. 4B, instead of display of a setting screen corresponding to a functions as illustrated in FIG. 2C or 3B.

In the initial screen illustrated in FIG. 4B, "Function selection" is displayed in the title display area T1 and operation keys of "Copy", "Transmission", "User box", and "External memory" corresponding the respective four functions are displayed in the setting key group T2 located below the title display area T1. The processor 10 causes display of the setting screen illustrated in FIG. 2C upon for example "Copy" being operated, and cause display of the setting screen illustrated in FIG. 3B upon for example "Transmission" being operated. Thus, a subsequent operation can be caused in the same manner as above. The above example describes a case where the rightward and downward swipe operation is performed as illustrated in FIG. 4A. However, the same is applied to a case for example where the movement direction of a swipe operation changes in the course of performing the swipe operation.

Figure 4B:
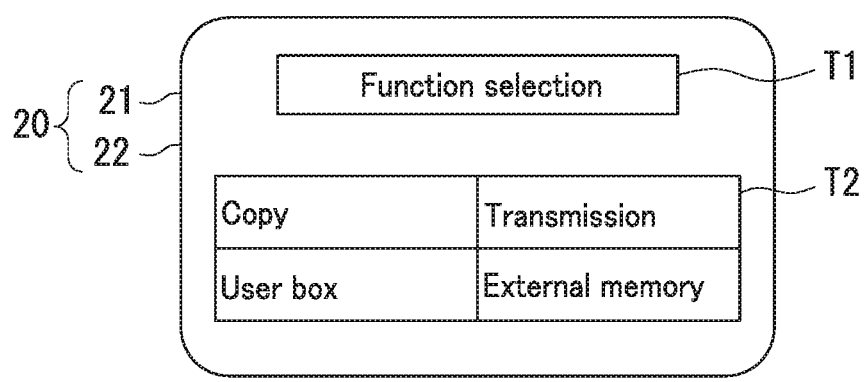

Specifically, in a situation in which the processor 10 cannot determine a to-be-used function according to the movement direction of a swipe operation, the processor 10 causes display of the initial screen as illustrated in FIG. 4B for subsequent setting of a to-be-used function. Through the above, the multifunction peripheral 1 becomes usable.

Similarly to the swipe operation as described above, operations that are detectable by the touch sensor 23 among operations to be performed by the user on the touch panel display 20 (touch panel 21) in the display suspension state can be associated with screens displayed as above (setting screens and initial screen). For example, when the user keeps the finger F in touch with the touch panel 21 for a long period of time without moving the contact point P (when the user performs a long press operation), the initial screen may be displayed. Furthermore, when a operation by which the contact point P draws an arc on the touch panel 21 is performed, the setting screen for the copy function, the setting screen for the data transmission function, the setting screen for the data internal storage function, and the setting screen for the data external storage function may be sequentially displayed in a cyclic manner. In the above configuration, the order of display of these setting screens may be reversed when a direction in which the arc is drawn is reversed.

Figure 5:
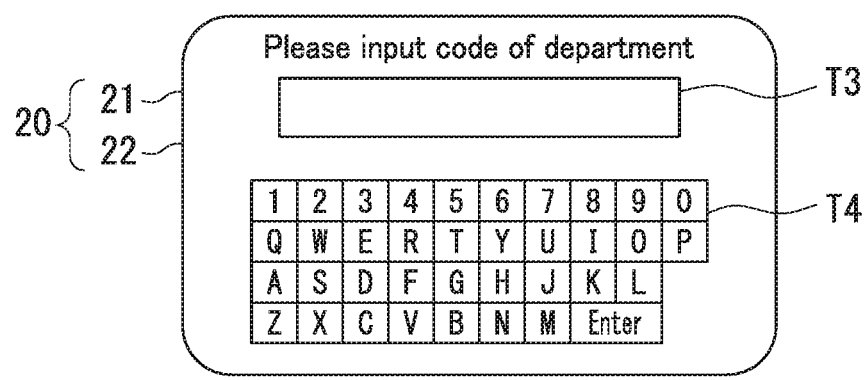
FIG. 5 is a diagram of an example of an authentication screen displayed on the touch panel display.

When the user operates the touch panel display 20 in the low power consumption mode, the setting screen illustrated in FIG. 2C or 3B or the initial screen illustrated in FIG. 4B is displayed in the above example. However, it is possible to display an authentication screen for user authentication by activating the display 22 before the setting screen or the initial screen as above is displayed. FIG. 5 illustrates an example of the authentication screen displayed before any of the setting screens or the initial screen is displayed.

As illustrated in FIG. 5, the processor 10 causes display of the authentication screen for user authentication to invite user input for authentication. For example, a code of a department to which the user belongs is input for user authentication. To do so, an input operation key group T4 is displayed below a department code input area T3. The input operation key group T4 includes a plurality of operation keys corresponding to characters and numerals and an enter key for input confirmation. The processor 10 recognizes that a character and/or a numeral is/are input through operation on a corresponding operation key(s) in the input operation key group T4, and causes display of the input in the department code input area T3. After the authentication screen is displayed, the processor 10 causes display of a setting screen corresponding to the movement direction of the swipe operation according to a result of authentication. Specifically, the processor 10 determines using the user recognition section 15 whether or not the input code of the department is pre-registered (passable). When the input code is determined to be passable, a setting screen or the initial screen that corresponds to the movement direction of the swipe operation as described above is displayed on the touch panel display 20.

By contrast, when the input code of the department is not pre-registered (unpassable), the processor 10 resets and causes re-display of the authentication screen illustrated in FIG. 5, or turns off the backlight of the display 22 again to return the touch panel display 20 to the previous state in the low power consumption mode.

Alternatively, the authentication screen may be displayed according to a selected function. For example, a configuration in which authentication (input of a code of a department) is necessary for carrying out any of the data transmission function, the data internal storage function, and the data external storage function while the authentication is unnecessary for carrying out the copy function, the processor 10 causes display of the authentication screen illustrated in FIG. 5 when recognizing that one of the data transmission function, the data internal storage function, and the data external storage function has been selected while causing no display of the authentication screen illustrated in FIG. 5 when recognizing that the copy function has been selected. That is, display and non-display of the authentication screen can be set according to a selected function (setting screen).

In the above example, the initial screen (refer to FIG. 4B) is displayed when the movement direction of a swipe direction performed on the touch panel display 20 in the low power consumption mode (display suspension state) cannot be determined. However, the operation of the multifunction peripheral 1 can be further efficiently performed also through the initial screen being displayed in any other situation. For example, when the processor 10 recognizes that the user operates the document reading section 12 to load a document in the low power consumption mode, the backlight is turned on and the initial screen is displayed on the touch panel display 20 likewise in the above example. Through the above, further performance of any of the four functions can be caused efficiently. Similarly, further performance of any of the four functions can be caused efficiently through the initial screen being displayed on the touch panel display 20 when the user operates an element other than the touch panel display 20 among the elements of the multifunction peripheral 1.

In the above example, the display 22 of the touch panel display 20 is inactive while the touch panel 21 (and touch sensor 23) is active in the low power consumption mode. However, the touch panel 21 is preferably inactive in cleaning of a surface of the touch panel display 20 using a duster or the like for example when the multifunction peripheral 1 is in the standby state. However, the multifunction peripheral 1 cannot be operated during the touch panel 21 being inactive. Therefore, it is preferable that the touch panel 21 is inactive for a specific period (for example, 60 seconds) but can return to being active after the specific period elapses. As such, a cleaning mode may be included in the operating modes in addition. The cleaning mode is a mode in the low power consumption mode in which the touch panel 21 is inactive only for a specific period while electric power supply to for example the image forming section 11 is restricted. The cleaning mode may be set for example through the user performing a long press operation in the low power consumption mode. In a configuration in which the initial screen is displayed by a long press operation being kept, the initial screen is displayed for example upon the long press operation being kept for a first period and the cleaning mode is set upon the long press operation being kept for a second period longer than the first period.

Alternatively, the cleaning mode may be set through a specific operation being performed on the touch panel display 20 (touch panel 21) within a prescribed period in the low power consumption mode. For example, when the user touches three points of the surface of the touch panel display 20 using three fingers and moves the three points continuously and linearly within the prescribed period, the processor 10 recognizes that such an operation has been performed based on a result of detection by the touch sensor 23.

Alternatively, when a point of touch is moved first linearly, turned at a specific angle, and then moved linearly after touch with the specific part of the touch panel display 20, that is, moved so as to write for example the letter V within the prescribed period, the processor 10 recognizes that such an operation has been performed based on a result of detection by the touch sensor 23. Alternatively, when the point of touch is moved first linearly, turned at a specific angle, moved linearly, turned at a specific angle, and then moved linearly after touch with the specific part of the touch panel display 20, that is, moved so as to write for example the letter Z within the prescribed period, the processor 10 recognizes that such an operation has been performed based on a result of detection by the touch sensor 23.

The user can perform such operations easily even when the display 22 is inactive. In the above configuration, the cleaning mode can be set by the user linearly moving plural points of touch on the touch panel display 20 within the prescribed period (for example, 5 seconds) or by the user linearly moving a point of touch plural times within the prescribed period, as described above. Besides, an operation that is distinguishable from the above-described simple swipe operation and that can be easily performed even in a state in which the display 22 is inactive can be set as an operation for setting the cleaning mode.

Figure 6:
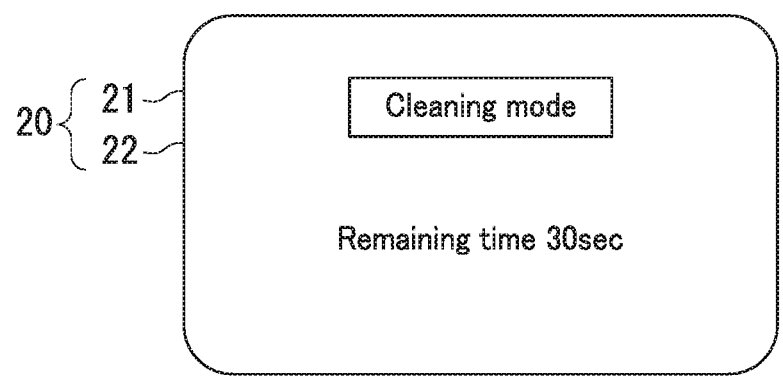
FIG. 6 is a diagram illustrating a display example that the touch panel display displays in a cleaning mode.

When the cleaning mode is set, the processor 10 releases restriction of electric power supply to the display 22 for the specific period and causes the display 22 to display an elapsed time since the start of restriction of the function of the touch panel 21 or a remaining time until restriction of the function of the touch panel 21 is released. That is, it is possible that the touch panel 21 is inactive while the display 22 is active in the cleaning mode in contrary to a case in the low power consumption mode. In the above configuration, a remaining time for which the touch panel 21 is inactive or an elapsed time since the cleaning mode has been set can be displayed. FIG. 6 illustrates a display example that the touch panel display 20 (display 22) displays in the above case. Through the above, the user can adequately clean the surface of the touch panel display 20. In the above configuration, the display 22 can be active as above only during the touch panel 21 being inactive and the display suspension state in which the touch panel 21 is active as above while the backlight of the display 22 is off can be set after the specific period elapses.

Note that the display 22 of the touch panel display 20 is a liquid-crystal display and the backlight is turned off in the low power consumption mode in the above example. However, another type of display can be used as the touch panel display 20. In a case where the touch panel display 20 is another type of display, electric power consumption by the touch panel display 20 can be reduced as a whole by setting the display suspension state in which no display is performed (function of the display 22 is restricted) through restriction of electric power supply to the display 22 in the low power consumption mode. As a consequence, an operation as above can be performed by restricting the function of the display 22 in the low electric power consumption even in a situation in which a display other than the liquid-crystal display is used as the display 22.

In the above example, the electronic device 1 is an image forming apparatus (multifunction peripheral). However, the present disclosure is applicable to any electronic device that has a plurality of functions likewise the electronic device and that includes the touch panel display 20. Any setting screens and any initial screen to be displayed can be set according to the functions of the electronic device.

What is claimed is:

1. An electronic device to which a low power consumption mode is settable, the low power consumption mode being a mode in which electric power supply to some of elements included in the electronic device is restricted in a standby state of the electronic device, the electronic device comprising:
   a touch panel display including a display for information display and a touch panel configured to receive an operation by a user, the display and the touch panel being overlaid one on the other;
   a touch sensor configured to detect a point of touch and a swipe operation, the point of touch being a point of a surface of the touch panel where the user touches, the swipe operation being an operation of moving the point of touch; and
   a processor, wherein
   the display includes a liquid crystal display and a backlight,
   in the low power consumption mode, the touch panel display is in a display suspension state in which electric power supply to the display is restricted,
   the backlight is turned off in the display suspension state, and
   when the user performs the swipe operation on the touch panel display in the display suspension state, the processor determines one setting screen of a plurality of setting screens according to a movement direction of the swipe operation and causes the display to display the selected setting screen in a state in which the backlight is turned on.

2. The electronic device according to claim 1, wherein the processor pre-stores therein correlations between the setting screens and movement directions of the swipe operation, and determines, based on the correlations, the one setting screen for display on the display according to the movement direction of the swipe operation detected by the touch sensor.

3. The electronic device according to claim 2, wherein in a situation in which a setting screen for display on the display cannot be determined from the movement direction of the swipe operation detected by the touch sensor based on the correlations even though the user operates the touch panel display in the display suspension state the processor causes the display to display an initial screen different from any of the setting screens.

4. The electronic device according to claim 3, wherein when the processor recognizes that an operation is performed by the user on an element of the electronic device other than the touch panel display in a state in which the touch panel display is in the display suspension state, the processor causes the display to display the initial screen.

5. The electronic device according to claim 3, wherein the electronic device has a plurality of functions, and the initial screen invites selection of any of the functions.

6. The electronic device according to claim 5, wherein the setting screens are each set for a corresponding one of the functions, and invite setting for carrying out the corresponding function.

7. The electronic device according to claim 5, wherein
the functions include at least a copy function or an image file outputting function, the copy function being a function of optically reading an image of a document and forming the read image on a recording medium for output, the image file outputting function being a function of outputting the read image as an image file.

8. The electronic device according to claim 3, wherein
a cleaning mode is further settable through a specific operation being performed on the touch panel display when the low power consumption mode is set in the standby state, the cleaning mode being a mode in which a function of the touch panel of the touch panel display is restricted only for a specific period.

9. The electronic device according to claim 8, wherein
in the low power consumption mode, the initial screen is displayed by the user performing a long press operation for a first period and the cleaning mode is set by performing the long press operation for a second period, the long press operation being an operation by the user touching the surface of the touch panel of the touch panel display without moving the point of touch, the second period being longer than the first period.

10. The electronic device according to claim 8, wherein
in the low power consumption mode, the cleaning mode is set by the user moving plural points of touch on the surface of the touch panel within a prescribed period or by the user moving a point of touch plural times within a prescribed period.

11. The electronic device according to claim 1, wherein
when the user operates the touch panel display in the display suspension state, the processor causes the display to display an authentication screen for authentication of the user to invite user input for authentication and causes the display to display the one setting screen according to a result of the authentication after the authentication screen is displayed.

12. The electronic device according to claim 1, wherein
a cleaning mode is further settable when the low power consumption mode is set in the standby state, the cleaning mode being a mode in which a function of the touch panel of the touch panel display is restricted only for a specific period.

13. The electronic device according to claim 12, wherein
when the cleaning mode is set, the processor releases restriction of electric power supply to the display for the specific period and causes the display to display an elapsed time since a start of restriction of the function of the touch panel or a remaining time until restriction of the function of the touch panel is released.

* * * * *